May 11, 1926.
Re. 16,349
I. D. TEFFT
FOUNTAIN PEN
Original Filed May 1, 1922
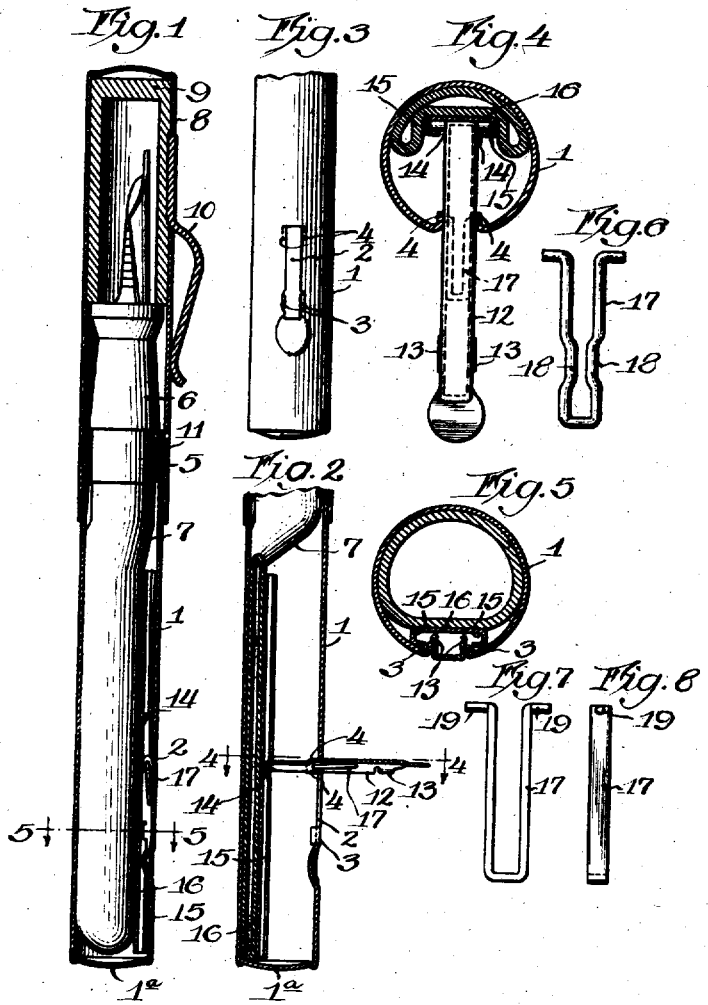
Inventor,
Isaac D. Tefft Reissued May 11, 1926.

Re. 16,349

UNITED STATES PATENT OFFICE.

IVAN D. TEFFT, OF GLENCOE, ILLINOIS, ASSIGNOR TO THE WAHL COMPANY, OF CHICAGO, ILLINOIS, A CORPORATION OF DELAWARE.

FOUNTAIN PEN.

Original No. 1,446,524, dated February 27, 1923, Serial No. 557,558, filed May 1, 1922. Application for reissue filed February 23, 1924. Serial No. 694,453.

My invention relates to fountain pens, primarily to that class commonly known as self fillers. The invention comprehended in the drawings and specification is applied to the so called all metal pen, but is not limited to pens of that particular construction.

The principal object of the invention herein described is to provide means whereby a lever which co-operates with the interior mechanism for compressing an ink sack for filling the fountain pen is fulcrumed in a longitudinally extending slot in the barrel. Heretofore it has been necessary in all metal pen construction to fulcrum the lever in the slot through a medium of a shell having a saddle thereon being slipped into the barrel. The lever is then hooked on to the saddle as is described in pending application of John C. Wahl, filed April 2, 1921, Serial No. 457,873. The other means for fulcruming the lever in the slot is to inturn the edges of the slot and form flanges; the lever is then introduced into the slot and a pin is inserted through aligned apertures in the lever and barrel flanges. This method is shown in my co-pending application dated April 10, 1922, Serial No. 551,121. Both of the aforementioned methods of affixing a lever in the slot in an all metal pen are unsatisfactory; the first because the shell takes up too much space within the barrel of the pen; the second because of the difficulty of assembling the lever in the slot. My present invention obviates the difficulties present in both of the other methods of assembly of the lever in the slot.

Other objects will appear hereinafter as the specification proceeds.

The invention consists in the combination and arrangements of parts hereinafter described and claimed, and will be best understood by reference to the accompanying drawings forming a part of this specification, and in which, Fig. 1 is a longitudinal sectional view of a fountain pen embodying my invention.

Fig. 2 is a longitudinal sectional view showing specific detailed construction with the lever in open position and the ink sack compressed, Fig. 3 is a plan view of a side of the barrel showing the longitudinal extending slot wherein the lever is mounted, Fig. 4 is a cross sectional view on the line 4—4 of Fig. 2, Fig. 5 is a cross sectional view on the line 5—5 of Fig. 1, Fig. 6 is a plan view of a modification of the element which affixes the lever within the slot.

Fig. 7 is a plan view of another modification of the element which holds the lever within the slot, and Fig. 8 is a side view of the modification shown in Fig. 7.

The numeral 1 indicates a barrel having a longitudinal extending slot 2 punched therein. During the process of punching out the slot 2, flanges 3 and 4 are formed and depressed into the chamber within the barrel 1. The lever end of the barrel 1 is enclosed by the tassie 1[a], which is spun therein. The upper end of the barrel is slightly beveled and has threads 5 rolled thereon. The usual pen section 6 having an ink sack 7 attached thereto is inserted into the upper end of the barrel and is held therein by frictional engagement with internal projections formed by the rolling of the threads 5. A cap 8 having an internal rubber shell 9 for enclosing the nib of the pen section is provided. A clip 10 is affixed to to the cap in a manner shown in Patent No. 1,279,186 granted to John C. Wahl and Wm. H. Odlum, dated September 17, 1918. Threads 11 are provided within the lower extremity of the cap which are adapted to engage the rolled threads 5 when the cap is introduced over the pen section.

A lever 12 having locking flanges 13 at its outermost extremity which co-operate with the flanges 3 for locking the lever in closed position is provided. In the forming of the lever, outstanding wings 14 are formed at its lowermost extremity, said outstanding wings 14 being adapted to engage under flanges 15 formed on the presser bar 16, the presser bar being mounted interiorly of the barrel directly beneath the longitudinal extending slot. The flanges 4 are provided for the purpose of fulcruming the lever within the slot, said flanges having aligned apertures therein, said aligned apertures being in alignment with corresponding apertures punched in the edge of the lever intermediate of its ends. Mounted between the flanges, formed in the stamping out of the lever 12, is a piano wire spring of small diameter having its ends bent outwardly as illustrated at 17 in Fig. 4. The spring is compressed when it is introduced between the flanges of the presser bar, the presser bar is then introduced into the slot and the apertures in the flanges 4 and in the presser bar 12 are aligned, whereupon the spring is slipped down until the lateral extending ends engage in the apertures, whereupon the spring expands and the ends of said spring snap into engagement of the apertures in the flanges 4, thus fulcruming the lever in the slot. When it is found necessary to disassemble the lever the operation is as follows:

A pin is introduced under the top edge of the spring and it (the spring) is forced outward from its frictional engagement with the flanges of the presser bar. A pair of pliers is then applied to the spring and it is compressed until the lateral extending ends are released from the apertures in the flanges 4, whereupon the presser bar is withdrawn from the slot. The provision of the spring or holding element 17 permits ease of assembly and ready accessibility of the lever and its corresponding parts. This has not been accomplished as heretofore explained in other all metal pens having the lever type of filling device. For that reason this invention was conceived.

The drawings show other modifications of the spring holding element. For instance, in Fig. 6 the holding element is shown with indentations 18 therein. These indentations are for the purpose of permitting the insertion of a tool between the sides of the flanges for compressing the spring. When the spring is compressed, the indented parts will ride over and under one another, the spring will be compressed and the lateral extending ends will be withdrawn from the apertures in the flanges 4. In Fig. 7 I have shown a holding element formed from a flat spring having round projections 19 extending therefrom; the assembly of the lever having this form of holding element therein is the same as described heretofore.

It is not thought necessary to describe those parts of the fountain pen shown that are not to be claimed in this application, as they are specifically described in my copending application dated April 10, 1922, Serial No. 551,121.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a fountain pen in combination, a barrel closed at its lower end, a pen section having a rubber sack mounted at its lowermost extremity affixed to the open end of the barrel the rubber sack extending therein, a longitudinally extending slot in said barrel, flanges formed on the walls of said slot, a flanged lever mounted in said slot, a presser bar co-operating with said lever for depressing the ink sack, and resilient means mounted between the flanges of the lever for fulcruming said lever in the slot.

2. In a fountain pen in combination, a barrel closed at its lower end, a pen section having a rubber sack mounted at its lowermost extremity affixed to the open end of the barrel the rubber sack extending therein, a longitudinally extending slot in said barrel, flanges formed on the walls of said slot, a flanged lever mounted in said slot, a presser bar co-operating with said lever for depressing the ink sack, and resilient means mounted between the flanges and co-operating with the inturned flanges formed in the barrel for fulcruming the said lever in the slot.

3. In a fountain pen, in combination, a casing provided with a longitudinal slot therein, fashioned at its marginal edges with pivot seats, a presser bar within the casing, a lever operatively connected therewith, provided with laterally disposed pivot seats intermediate its length and a looped spring member supported in connection with the lever and provided at its free ends with laterally extending pivot members adapted for seating in the pivot seats in the lever and in the casing.

4. In a fountain pen, in combination, a casing provided with a longitudinal slot therein, fashioned at its marginal edges with pivot seats, a presser bar within the casing, a lever operatively connected therewith provided with laterally disposed pivot seats intermediate its length and a looped spring member tensionally supported in connection with the lever and provided at its free ends with laterally extending pivot members adapted for seating in the pivot seats in the lever and in the casing.

5. In a fountain pen, a casing provided with a longitudinal slot therein fashioned at its marginal edges to afford pivot seats, a lever fashioned at its marginal edges to afford pivot seats and a resilient member fashioned with pivot members adapted for tensional entry and support in the pivot seats respectively on the casing and lever.

6. In a fountain pen, in combination, a slotted casing, pivot seat members adjacent the slot, a lever provided with pivot seats and an expansible spring member supported in connection with the lever and provided with pivot members adapted for tensional seating in the pivot seats in the lever and the seats in the pivot members associated with the casing.

7. In a fountain pen, in combination, a slotted casing, pivot seat members adjacent the slot, a lever having spaced flanged members provided with pivot seats and a flexed spring bar tensionally supported between the flanges of the lever and fashioned with pivot members adapted for tensional seating in the pivot seats in the lever and the seats in the pivot members associated with the casing.

8. In a self filling fountain pen, an ink reservoir shell formed of sheet metal, portions of said sheet metal being bent inwardly of the shell providing an opening through the shell and flanges at opposite sides of said opening, and a lever extending through said opening having oppositely projecting pivot extensions thereon received in bearing openings formed in said flanges.

IVAN D. TEFFT.